Oct. 13, 1964 | J. MARTIN | 3,152,781
VEHICLE EJECTION SEATS
Filed Feb. 15, 1963
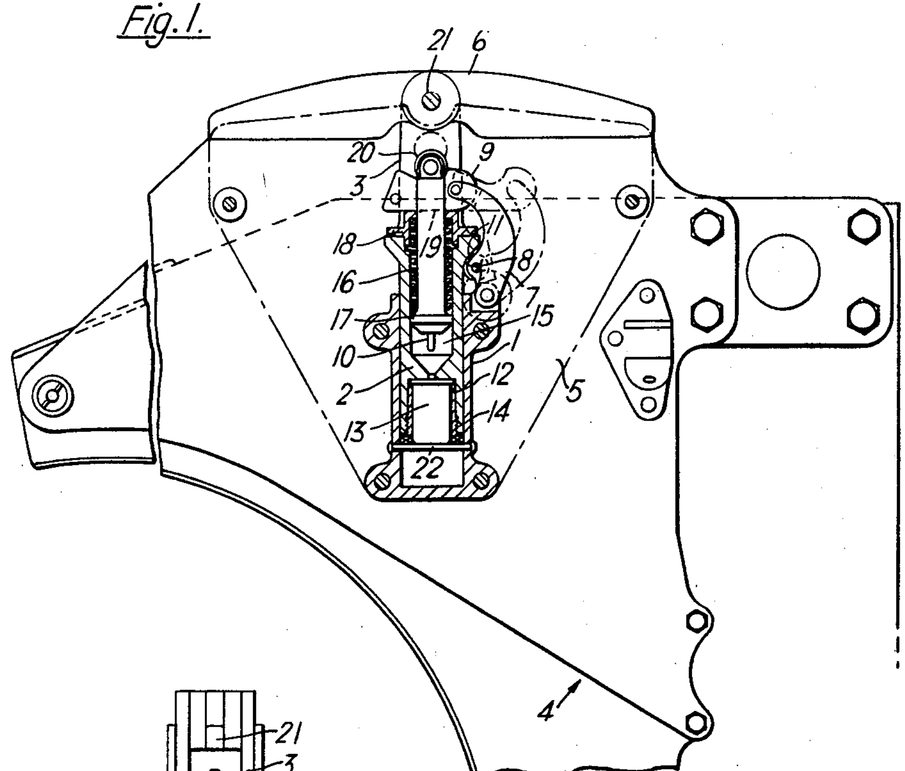
Inventor
JAMES MARTIN
By [signature]
Agent United States Patent Office 3,152,781

Patented Oct. 13, 1964

3,152,781

VEHICLE EJECTION SEATS

James Martin, Southlands Manor, Southlands Road, Denham, near Uxbridge, Middlesex, England Filed Feb. 15, 1963, Ser. No. 258,832
Claims priority, application Great Britain, Feb. 16, 1962, 5,991/62
5 Claims. (Cl. 244—122)

This invention relates to vehicle escape systems, in particular escape systems for aircraft and other analogous vehicles designated herein as "aircraft."

With the advance that has taken place in the development of aircraft escape systems including ejection seats, the likelihood of an airman having to enter the water while in an aircraft, for example in the event of an emergency while flying over the sea, has been reduced to almost negligible proportions. However, in the case of aircraft operating from naval aircraft carriers there is an ever present danger of an airman and his aircraft entering the water as a result of the aircraft failing to be arrested by the arrestor devices on the carrier and falling over the side of the carrier, or as the result of engine failure or like mishap during take-off.

It is with this hazard in mind that the apparatus of the present invention has been devised with the object of providing escape facilities particularly adapted to assist an airman to escape satisfactorily, by the use of an ejection seat, from the cockpit of a fully immersed aircraft.

It will be appreciated that before an escape can be made from the cockpit of an immersed aircraft it is necessary that the cockpit canopy be removed unless escape can be effected through the canopy by penetration thereof by the ejection seat/airman combination.

Research and experimentation has demonstrated that jettison of the cockpit canopy by conventional explosive means, for example explosive plungers such as disclosed in Patent No. 2,982,502, is possible under water, but it has been found in some cases that, immediately after the canopy is lifted by such means, the bubble of air previously retained in the cockpit by the canopy escapes and the canopy is forced back into place by the hydrostatic pressure to which it is exposed.

It is therefore considered preferable to provide for escape through the cockpit canopy, where the construction of the canopy is suitable, and to avoid making any attempt to jettison the canopy under water with the possibility that the canopy may not be jettisoned clear of the escape path and may, instead, take up a position that would preclude success in a subsequent attempt to escape through the canopy. However, although the aircraft may, for the purpose of enabling escape to be made through the canopy, have a canopy of a construction capable of being penetrated by the seat/airman combination, such a canopy may in some cases prove to be impenetrable by the ejection seat under the thrust of a conventional ejection gun designed to effect ejection in an air environment, the hydrostatic pressure on the submerged canopy bracing the material thereof.

Thus, an object of this invention is to provide a penetrating device for attachment to an aircraft ejection seat to assist the said ejection seat to penetrate a cockpit canopy in its path.

Thus, in one aspect, the invention provides, for attachment to an ejection seat, a canopy-breaker comprising a piston and cylinder assembly one component of which is adapted to be so secured to an ejection seat that extension of such assembly moves the other component towards a canopy to be penetrated by the seat, explosive means for generating and supplying gas to said assembly to cause forcible extension thereof, and striker means on said other component for engaging and rupturing the canopy upon extension of said assembly.

Desirably the arrangement is such as to provide for firing of said explosive means as a consequence of engagement of said striker means with the canopy during initial ejection movement of the seat.

Thus a canopy-breaker in accordance with another aspect of the invention comprises a piston and cylinder assembly one component of which is adapted to be so secured to an ejection seat that extension of such assembly moves the other component towards a canopy to be penetrated by the seat, explosive means for generating and supplying gas to said assembly to cause forcible extension thereof, striker means on said other component for rupturing the canopy upon said forcible extension of the assembly with the striker means engaged with the canopy, yieldable means retaining said assembly in partially extending condition, and an initiator for firing said explosive means in response to compression of the partially extended assembly.

Preferably the explosive means, conveniently in the form of a cartridge housed within the piston, is fired by the movement of a firing pin biased towards the cartridge by a compression spring and retained in spaced relation from said cartridge by a withdrawable sear, said sear being adapted to be withdrawn from the firing pin, to release the latter for movement towards the cartridge, by an actuator; the latter may, for instance, be a lever attached at one end to said sear and pivoted at its other end to the cylinder of the assembly, such lever having an abutment in its length for engaging against a cam lug on the piston so that when the piston is forced into the cylinder the cam lug on the piston moves the actuator lever to withdraw the sear from the firing pin. Conveniently the sear is shaped to retract the firing pin against the action of the compression spring before releasing the firing pin so that the spring is not fully stressed until the moment of release of the firing pin.

Further features of this invention will become apparent from the following description of a typical embodiment of the invention, illustrated in the accompanying drawings in which:

FIGURE 1 is a diagrammatic side elevation of the upper part of an aircraft ejection seat, showing partially a canopy-breaker in accordance with the invention fitted to such seat; and FIGURE 2 is an elevation of the canopy-breaker of FIGURE 1.

The canopy-breaker device illustrated in the drawings comprises a cylindrical body 1 closed at one end and having partially telescoped therewithin a piston 2 the free end 3 of which is bifurcated. The body cylinder 1 is adapted to be secured, closed end downwards, to an ejection seat 4 near the upper end thereof by means of a pair of side plates 5 which sandwich between them the cylinder and piston assembly 1, 2, together with striker means in the form of a blade-like shattering member 6.

As shown, such an assembly may be secured to the upper part of one side of the ejection seat 4 and, if required, more than one such canopy-breaker may be fitted to the seat.

The cylinder 1 has one end of a curved actuator lever 7 pivoted thereto, this lever having an abutment, in the form of a roller 8, near the mid-point of the length of the lever. The free end of the actuator lever has a sear 9 pivotally secured thereto which sear normally retains a firing pin 10, positioned within an axial bore in the piston 2, in a half-cocked position, the firing pin 10 and its associated parts being described more fully hereinafter. The abutment roller 8 on the actuator lever 7 is adapted to engage a wedge-shaped cam lug 11 on the wall of the piston 2 so that when the piston 2 is forced downwardly into the cylinder 1 during the ejection sequence hereinafter described, the lug 11 on the piston 2 urges the abutment roller 8 outwardly to rock the actuator lever 7 about its connection to the cylinder 1 and so withdraw the sear 9 from the firing pin 10.

As shown, the piston 2 is a substantially cylindrical body, the upper end 3 thereof being bifurcated, and the lower end of the piston body having a central axial recess 12 adapted to receive an explosive cartridge 13, this cartridge 13 being retained in the recess 12 by means of a sleeve 14 threadedly engaged with the walls of recess 12. The inner (upper) end of the recess 12 communicates with an axial bore 15 in the piston, this bore 15 housing the firing pin 10 and a compression spring 16 through which the pin 10 passes. The compression spring 16 is retained in the bore 15 by engagement with the upper flat surface of a frusto-conical flange 17 near the base of the pin and with a cap 18 secured to the piston 2 at the point of bifurcation thereof. Normally the pin 10 is so retained by the sear 9 that the compression spring 16 is partially compressed.

The sear 9 passes through a diametrical slot 19 in the firing pin 10 and to assist in withdrawing the sear 9 from the firing pin 10, a freely-rotatable roller 20 is provided as a bearing at the upper end of the slot 19.

The shattering member 6 is pivoted between its ends on a pin 21 extending through the extremities of the bifurcations of the upper end 3 of the piston 2.

The piston 2 is restrained from movement outwardly of the cylinder 1 by the sear 9 which is connected to the actuator lever 7 and the piston 2 is normally restrained from movement into the cylinder 1 by a shear pin 22 extending diametrically across the cylinder 1 adjacent to the inner end of the piston 2, this pin 22 being adapted to shear when a thrust exceeding a predetermined value is exerted upon the blade-like shattering member 6.

The ejection seat 4, which may for example be of the kind manufactured by the Martin-Baker Aircraft Co., Ltd., the subject of Patents Nos. 2,467,763, 2,527,020, 2,569,638 and 2,708,083, and fitted with one or more of the above described canopy breakers will be capable of safe underwater operation for ejection through a penetrable cockpit canopy (indicated at 23 in FIGURE 1) by means of a suitable ejection gun (not shown). With such an arrangement, extension of the ejection gun to effect ejection of the seat 4 from the aircraft first forces the ejection seat towards the cockpit canopy 23 so that the shattering member 6 of the canopy-breaker engages the underside of the canopy 23 whereupon the continued movement of the seat 4 causes the piston 2 to be forced into the cylinder 1 (with shearing of the shear pin 22). Such movement of the piston 2 into the cylinder 1 causes rocking of the actuator lever 7 to withdraw the sear 9 from the firing pin 10 whereby the latter is first retracted fully to compress spring 16 and then released to fire the cartridge 13 to cause the piston 2 to be violently thrust upwardly out of the cylinder 1. This thrust causes the shattering member 6 to rupture the canopy 23 and so facilitate the continued movement of the seat 4 out of the aircraft through the canopy 23.

I claim:

1. In combination with an aircraft ejection seat arranged under a canopy, a canopy breaker comprising an assembly having two components, said components being a piston and a cylinder movable in relation to one another, one of said components being secured to the ejection seat and the other component being mounted for movement towards the canopy, explosive means for generating and supplying gas to said cylinder to cause said movement of the other component, and canopy shattering means on said other camponent arranged to penetrate through, and rupture, said canopy upon said movement.

2. In combination with an aircraft ejection seat arranged under a canopy, a canopy breaker comprising an assembly having two components, said components being a piston and a cylinder movable in relation to one another, one of said components being secured to the ejection seat and the other component being mounted for movement towards said canopy, explosive means for generating and supplying gas to said cylinder to cause said movement of the other component, striker means on said other component arranged to rupture the canopy upon engagement therewith, yieldable means retaining said assembly in partially extended condition, and an initiator for firing the explosive means in response to compression of the yieldable means.

3. In the combination of claim 2, said explosive means comprising a cartridge housed within said piston and said initiator comprising a firing pin spring-biassed towards the cartridge, a withdrawable sear retaining said firing pin in spaced relation to said cartridge, and an actuator for withdrawing said sear from the firing pin to release the latter for movement towards the cartridge.

4. In the combination of claim 3, said actuator comprising a lever attached at one end to said sear and pivoted at its other end to the cylinder of the assembly, an abutment on said lever and a cam lug on the piston positioned to engage said abutment, when the piston is forced into the cylinder, to move the actuator lever to withdraw the sear from the firing pin.

5. In the combination of claim 4, said sear being shaped to retract the firing pin from said cartridge before releasing the firing pin by withdrawal of the sear.

References Cited in the file of this patent

UNITED STATES PATENTS

| | | |
|---|---|---|
| 2,502,470 | Martin | Apr. 4, 1950 |
| 2,609,730 | Bergstrom | Sept. 9, 1952 |
| 2,844,073 | Re et al. | July 22, 1958 |
| 2,906,175 | Mohaupt | Sept. 29, 1959 |
| 2,953,065 | Brown | Sept. 20, 1960 |
| 2,982,502 | Martin | May 2, 1961 |